United States Patent
Zonio et al.

(10) Patent No.: US 10,131,429 B2
(45) Date of Patent: Nov. 20, 2018

(54) METHOD AND SYSTEMS OF AUTONOMOUSLY PICKING UP WATER IN SUPPORT OF FIRE FIGHTING MISSIONS

(71) Applicant: LOCKHEED MARTIN CORPORATION, Bethesda, MD (US)

(72) Inventors: Christopher Zonio, Endicott, NY (US); Thomas Spura, Endicott, NY (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 102 days.

(21) Appl. No.: 15/296,189

(22) Filed: Oct. 18, 2016

(65) Prior Publication Data

US 2017/0121022 A1    May 4, 2017

Related U.S. Application Data

(60) Provisional application No. 62/249,608, filed on Nov. 2, 2015.

(51) Int. Cl.

| | | |
|---|---|---|
| *B64D 1/22* | (2006.01) | |
| *A62C 31/00* | (2006.01) | |
| *B64C 39/02* | (2006.01) | |
| *B64D 47/08* | (2006.01) | |
| *G05D 1/04* | (2006.01) | |
| *G05D 1/06* | (2006.01) | |

(52) U.S. Cl.
CPC ............... *B64D 1/22* (2013.01); *A62C 31/00* (2013.01); *B64C 39/024* (2013.01); *B64D 47/08* (2013.01); *G05D 1/042* (2013.01); *G05D 1/0607* (2013.01); *B64C 2201/024* (2013.01); *B64C 2201/12* (2013.01); *B64C 2201/128* (2013.01)

(58) Field of Classification Search
None
See application file for complete search history.

(56) References Cited

U.S. PATENT DOCUMENTS

| | | | |
|---|---|---|---|
| 3,248,074 A | | 4/1966 | Corbitt |
| 4,474,245 A | | 10/1984 | Arney |
| 4,608,863 A | * | 9/1986 | Cooper ................. G01P 15/032 116/DIG. 43 |
| 6,125,942 A | * | 10/2000 | Kaufman ............. A62C 3/0235 169/53 |
| 6,364,026 B1 | | 4/2002 | Doshay |
| 7,337,156 B2 | | 2/2008 | Wippich |
| 9,079,662 B1 | | 7/2015 | Duffy et al. |

(Continued)

FOREIGN PATENT DOCUMENTS

| | | |
|---|---|---|
| CN | 103253373 | 8/2013 |
| CN | 203385413 | 1/2014 |

(Continued)

*Primary Examiner* — Ryan Rink
(74) *Attorney, Agent, or Firm* — Kent Kemeny; Andrew M. Calderon; Roberts Mlotkowski Safran Cole & Calderon, P.C.

(57) ABSTRACT

The disclosure is directed to systems and methods for autonomously picking up water in support of fire fighting missions using aerial vehicles. More particularly, the disclosure is directed to systems and methods for picking up water in support of fire fighting missions using onboard sensing and decision making processes with application of the fire retardant using unmanned aerial vehicles.

20 Claims, 4 Drawing Sheets

(56) References Cited

U.S. PATENT DOCUMENTS

| | | | |
|---|---|---|---|
| 2003/0146005 A1* | 8/2003 | Brooke | B64D 1/16 169/53 |
| 2005/0087651 A1* | 4/2005 | Powers | B64D 1/16 244/136 |
| 2006/0097112 A1* | 5/2006 | Hall | A62C 3/0235 244/136 |
| 2010/0044156 A1* | 2/2010 | Tkebuchava | B64D 1/22 182/231 |
| 2011/0155400 A1* | 6/2011 | Karagounis | A62C 3/0235 169/53 |
| 2013/0134254 A1 | 5/2013 | Moore | |
| 2014/0000917 A1* | 1/2014 | Stupakis | A62C 3/0242 169/53 |
| 2016/0246304 A1* | 8/2016 | Canoy | G05D 1/0816 |
| 2017/0066530 A1* | 3/2017 | Salzmann | B64C 27/04 |
| 2017/0261998 A1* | 9/2017 | Wang | G05D 1/102 |

FOREIGN PATENT DOCUMENTS

| | | |
|---|---|---|
| CN | 104155297 | 11/2014 |
| GB | 2145624 | 3/1985 |
| WO | WO2009054015 | 4/2009 |

\* cited by examiner

METHOD AND SYSTEMS OF AUTONOMOUSLY PICKING UP WATER IN SUPPORT OF FIRE FIGHTING MISSIONS

FIELD OF THE INVENTION

The invention is directed to systems and methods for autonomously picking up water in support of fire fighting missions using aerial vehicles. More particularly, the invention is directed to systems and methods for picking up water in support of fire fighting missions using onboard sensing and decision making processes using unmanned aerial vehicles.

BACKGROUND DESCRIPTION

Aerial firefighting is a key tool used by many governmental services (e.g., DOI, Forestry, National Parks, etc.) to control and douse wildfires, etc. The use of manned aerial vehicles in the fight against wildfires is a common practice. The manned aerial vehicles are used to, for example, pick-up water or fire retardant and use such to douse or suppress the fire.

The time to get the water or retardant on the fire is crucial. These manned aerial vehicles pose many problems and safety issue concerns, though. For example, amongst many other issues, it is dangerous to fly manned aerial vehicles when visibility is poor.

SUMMARY OF THE INVENTION

In an aspect of the invention, an unmanned aerial vehicle system includes: a plurality of sensors provided on the unmanned aerial vehicle to at least sense a distance above a water source; and a controller to automatically control a descent and ascent of the unmanned aerial vehicle based on the sensed distance of the unmanned aerial vehicle from the water source and upon a bucket of the unmanned aerial vehicle entering the water source, maintaining an altitude for a predetermined time.

In an aspect of the invention, a computer program product comprises a computer readable storage medium having program instructions embodied therewith. The program instructions are executable by a computing device to cause the computing device to: receive external environmental conditions from one or more sensors associated with an unmanned aerial vehicle; automatically control a descent of the unmanned aerial vehicle to a water source based on the receive external environmental conditions; fill a bucket on the unmanned aerial vehicle with water from the water source; and automatically control an ascent of the unmanned aerial vehicle upon filling of the bucket.

In an aspect of the invention, a system comprises: a CPU, a computer readable memory and a computer readable storage medium; program instructions to sense a distance of an unmanned aerial vehicle from a water source and descend to the water source; program instructions to sense a reduced weight of a bucket of the unmanned aerial vehicle as the bucket enters the water source; and program instructions to ascend the unmanned aerial vehicle after a predetermined amount of time has passed when the bucket enters the water. The program instructions are stored on the computer readable storage medium for execution by the CPU via the computer readable memory.

BRIEF DESCRIPTION OF THE DRAWINGS

The invention is described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF EMBODIMENTS OF THE INVENTION

The invention is directed to systems and methods for autonomously picking up water in support of fire fighting missions using aerial vehicles. More particularly, the invention is directed to systems and methods for picking up water in support of fire fighting missions using onboard sensing and decision making processes, using unmanned aerial vehicles. The aerial vehicles can be, for example, unmanned helicopters, airplanes and other types of drones.

In embodiments, the systems and methods described herein are used in unmanned aerial vehicles (UAVs) for use in suppressing wildfires; although other applications are also contemplated herein. As a result of onboard sensors, the UAVs are capable of operating in environmental conditions that are hazardous and/or unacceptable for manned operations, specifically in low visibility and/or at night time. Also, with the use of onboard sensors, the UAVs are capable of "Auto-Dipping" functions as part of the mission plan. This function utilizes onboard sensors and software/hardware to allow the aircraft to safely descend and collect water and return to a safe altitude.

The present invention provides several advantages which include by way of illustrative examples, amongst others:

(i) speeding up and making safer the dipping function of water or fire retardant retrieval;

(ii) reducing the ground operator's work load;

(iii) providing the capabilities to operate throughout the full day, whereas manned fire fighting without the capabilities provided herein only occurs during the day time and when visibility is determined be safe for flying;

(iv) allowing the maneuver to continue without connectivity, once initiated, which allows the UAV to collect water in areas of no Beyond Line of Sight coverage (BLOS); and (v) providing consistent and repeatable results ensuring safety of the system, as opposed to individual pilot idiosyncrasies.

System Implementations

Figure 1:
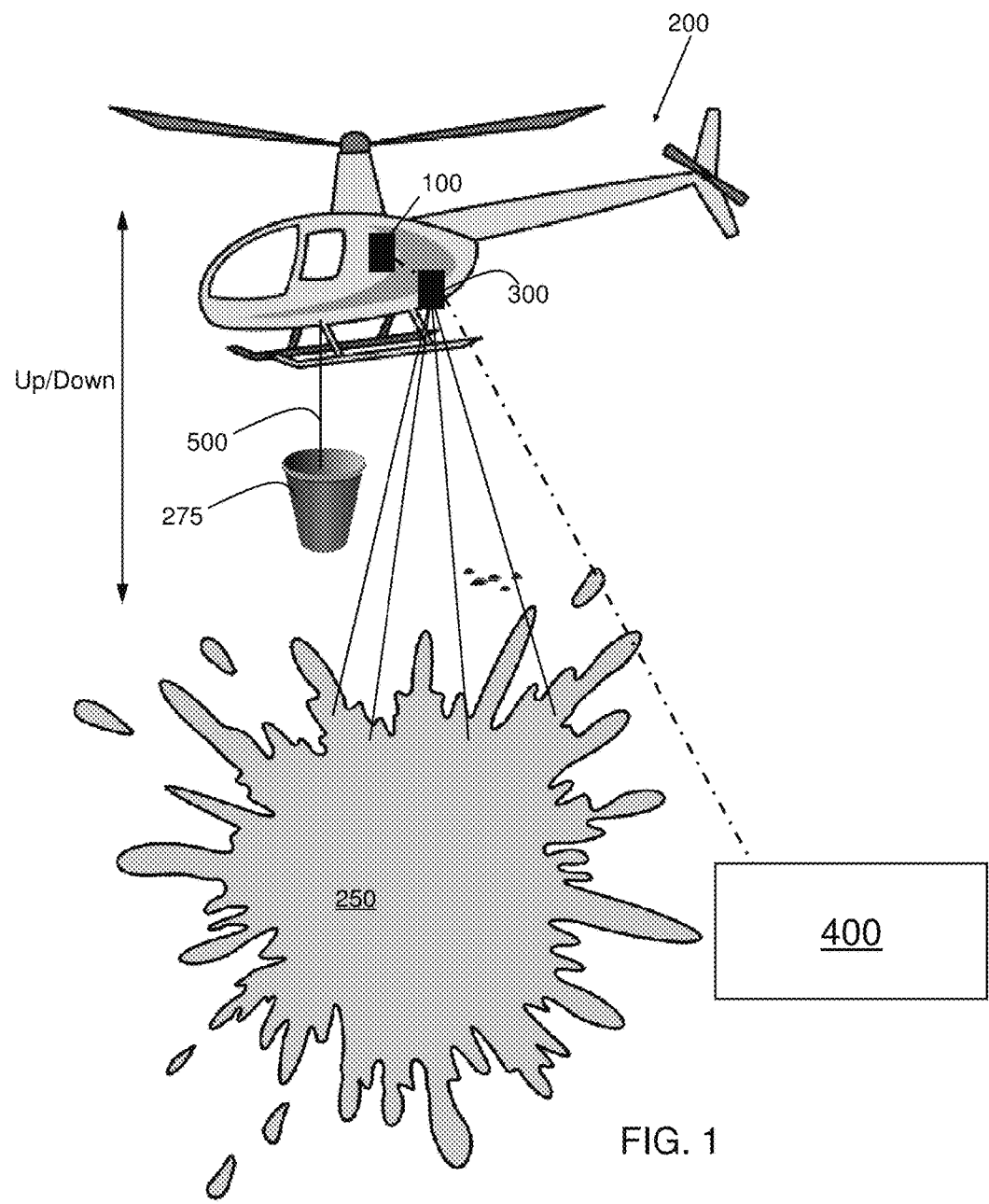
FIG. 1 shows an aerial vehicle with onboard sensors and decision making capabilities in accordance with aspects of the invention.

FIG. 1 shows an aerial vehicle with onboard sensors in accordance with aspects of the invention. More specifically, the aerial vehicle 200 can be, e.g., any unmanned aerial vehicles (UAVs) for use in suppressing wildfires. The aerial vehicle 200 can be, for example, an airplane, helicopter or drone.

In embodiments, the aerial vehicle 200 includes a plurality of sensors 300. In embodiments, the sensors 300 sense external environmental conditions and allow the aerial vehicle 200 to maneuver to a water source 250 and fill the retardant collection device (e.g., bucket) 275 and return to a safe altitude with or without operator intervention. The sensors 300 include, for example, RADAR, LIDAR, Acoustic Ranging and/or Radar Altimeters and weight and/or load sensors. The sensors 300 can also be representative of a camera system.

The RADAR can be used to identify obstructions; whereas, the LIDAR, Acoustic Ranging and/or Radar Altimeters can measure altitude above the terrain (e.g., water 250) beneath an aircraft, by timing how long it takes a beam of radio waves to reflect from the ground and return to the aircraft. This type of altimeter provides the distance between the antenna and the ground directly below it, which can be translated into terrain mapping. Terrain features that can be identified also include, for example, any body of water, such as rivers and lakes, ridge lines, cliffs adjacent to the water, etc. Sensors can also determine prevailing winds and speed by comparing airspeed of the aerial vehicle 200 and GPS track information, as well as latitude and longitudinal information.

In embodiments, the load sensor can sense an initial decrease in weight of the bucket when it is placed in the water (e.g., when a load is taken off the bucket 275). This allows the aerial vehicle 200 to be placed in a hover mode at a constant altitude and wait a predetermined amount of time, e.g., six seconds, to allow the bucket to fill with water. The load sensors can also determine the weight of the water within the bucket 275 to ensure that it is not overloaded and/or that the aerial vehicle 200 will still have adequate power to begin its ascent and flight. Accordingly, in embodiments, the load sensor can be provided on a main hook (line) 500 holding the bucket 275 to ensure that weight or load limits of the aerial vehicle 200 is not exceeded, for example. Other sensors are also contemplated by the present invention, and it should be understood that the above noted sensors are only illustrative, exemplary sensors provided for a complete understanding of the invention.

In embodiments, the information from the sensors 300 can be transmitted to a controller, e.g., system controller 100, to control the flight mission. For example, the system controller 100 can determine altitude (height from the water), water load in the bucket, obstructions or obstacles to avoid, the need to abort the mission for safety issues, and positional information of the aerial vehicle 200, e.g., longitude and latitude, for application of picking up water from a body of water 250. Pictures from the camera system can also be provided to the system controller 100, for downloading to the ground based systems 400.

By way of example, by the collection of this data, the system controller 100 can autonomously control all aspects of the flight mission. For example, the system controller 100 can (i) assess the distance from the water so that the aerial vehicle 200 can automatically be lowered for filling of the bucket 275 into the water, (ii) hold the aerial vehicle 200 at a certain height to continue scanning for obstacles or obstructions, (iii) abort the mission if any obstructions are found, e.g., safety issues, (iv) ensure that the bucket 275 is not overloaded, and (v) raise the aerial vehicle 200 after the bucket 275 is filled.

This information can also be given to the ground based systems 400 in order to coordinate ground efforts. Also, the operator of the ground based systems 400 can initiate the auto-dipping function while having data link connectivity to the system controller 100. Once the aerial vehicle 200 begins the maneuver, connectivity may be lost due to terrain, but the aerial vehicle 200 will continue as long as the safety measures are not triggered by the system controller 100. For example, if an obstruction is not found, then the aerial vehicle 200 will lower itself so that the bucket 275 can fill with water; whereas, if an obstruction is found, the mission can be automatically aborted and the aerial vehicle 200 can begin its ascent and return to its starting altitude where connectivity is regained by the operator.

Accordingly, as a result of onboard sensors 300 utilizing multi-spectral sensing capabilities, the aerial vehicle 200 is capable of operating in environmental conditions that are hazardous and/or unacceptable, specifically in low visibility and/or at night time. Also, with the use of onboard sensing, the aerial vehicle 200 is capable of auto-filling of the bucket without manual intervention.

System Environment

Figure 2:
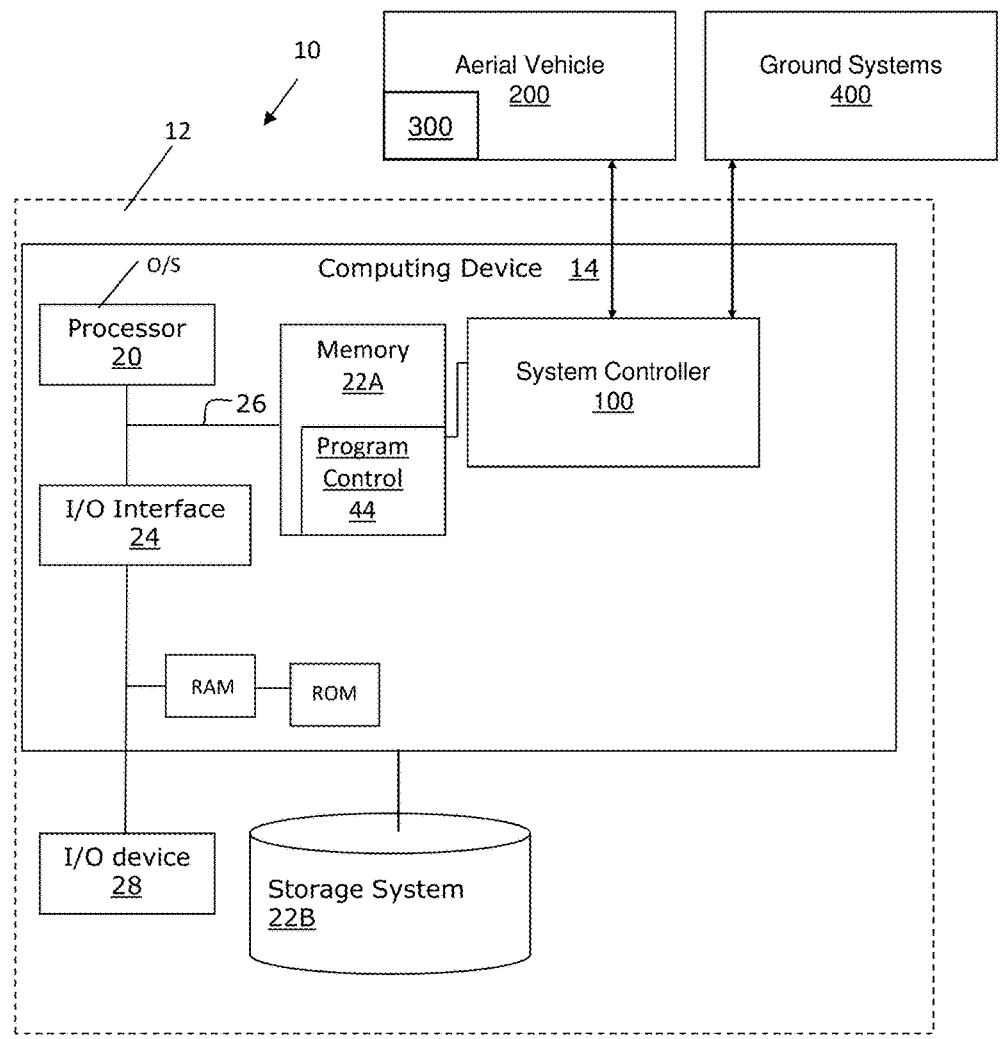
FIG. 2 shows an illustrative environment for implementing the steps in accordance with aspects of the invention.

FIG. 2 shows an illustrative environment 10 for managing the processes in accordance with the invention. The environment 10 includes a server or other computing system 12 that can perform the processes described herein. In embodiments, the illustrative environment may be used in the aerial vehicle 200 for assisting in the suppression of fires using fire retardants, as shown illustratively in FIG. 1; although other aerial vehicle systems are also contemplated by the present invention.

The computing system 12 includes a computing device 14 which can be resident on or communicate with a network infrastructure or other computing devices. The computing system 12 can communicate with both an aerial vehicle 200 and a plurality of sensors 300 on the aerial vehicle 200. In embodiments, the computing system 12 can be located on the aerial vehicle 200 or remote from the aerial vehicle 200. In further embodiments, the computing system 12 can communicate with ground based systems 400 such as, for example, ground-based controllers used in fire suppression systems, e.g., central control systems. In fact, the computing system 12 can also be representative of the ground based systems 400.

The computing device 14 includes a processor 20, memory 22A, an I/O interface 24, and a bus 26. In addition, the computing device includes random access memory (RAM), a read-only memory (ROM), and an operating system (O/S). The computing device 14 is in communication with an external I/O device/resource 28 and the storage system 22B. The I/O device 28 can comprise any device that enables an individual to interact with the computing device 14 (e.g., user interface) or any device that enables the computing device 14 to communicate with one or more other computing devices using any type of communications link or any device that enables the computing device 14 to interact with is environment.

The processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24. The program code 44 executes the processes of the invention such as, for example, auto-filling of a bucket of the aerial vehicle 200. In further embodiments, the program code 44 executes instructions based on signals it receives from the various sensors 300 on the aerial vehicle 200. For example, the program code 44 executes instructions to control the aerial vehicle 200 based on external conditions as sensed/detected by the various sensors 300 on the aerial vehicle 200. These controls can include, amongst other things:

(i) allow the aerial vehicle 200 to maneuver to a water source 250 and fill the retardant collection device (e.g., bucket) 275 and return to a safe altitude with or without operator intervention;

(ii) determine the loads placed on the aerial vehicle 200 and ensure that, for example, a load of the water within the bucket 275 does not exceed safety limits of the aerial vehicle 200;

(iii) allow the aerial vehicle 200 to automatically descent and ascend from a water source;

(iv) allow the aerial vehicle 200 to automatically maneuver around obstacles and obstructions, etc.;

(v) abort a mission of the aerial vehicle and ascend to its original (or other) altitude prior to aborting of the mission when a safety load limit is exceeded or other sensed parameter is found that would jeopardize the mission; and/or (vi) allow the aerial vehicle 200 to automatically be placed in a hover mode at a constant altitude in order to fill the bucket with water.

As discussed in detail herein, by allowing such functionality and autonomous control, it is now possible to speed up and make safer the dipping function of the aerial vehicle 200 using onboard sensing 300 and decision making processes (e.g., computing system 12).

The computing device 14 includes the system controller 100, which can be implemented as one or more program code in the program code 44 stored in memory 22A as a separate or combined module. Additionally, the system controller 100 may be implemented as separate dedicated processors or a single or several processors to provide the functionality of this tool. Moreover, it should be understood by those of ordinary skill in the art that the system controller 100 is used as a general descriptive term for providing the features and/or functions of the present invention, and that the system controller 100 may comprise many different components such as, for example, the components and/or infrastructure described and shown with reference to FIGS. 1 and 2.

In embodiments, the program code 44 and more specifically the system controller 100 communicates with ground based systems 400 such as, for example, ground controllers used in fire suppression systems, e.g., central control systems, and the aerial vehicle 200 and more specifically the sensors and onboard navigation systems (also shown at reference numeral 300 of FIG. 1). The system controller 100 can identify key factors for the pick-up of water as described herein.

The present invention may be embodied as a system, method or computer program product. The present invention may take the form of a hardware embodiment, a software embodiment or a combination of software and hardware. Furthermore, the present invention may take the form of a computer program product embodied in any tangible storage having computer-usable program code embodied in the medium (non-transitory medium). The computer-usable or computer-readable medium may be medium that can contain or store information for use by or in connection with the instruction execution system, apparatus, or device. The computer-usable or computer-readable medium may be, for example, an electronic, magnetic, optical, electromagnetic, infrared, or semiconductor system, apparatus, or device. More specific examples of the computer readable storage medium, memory or device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium, memory or device, or computer-usable or computer-readable medium, as used herein, is not to be construed as being transitory signals per se.

Processes

Figure 3:
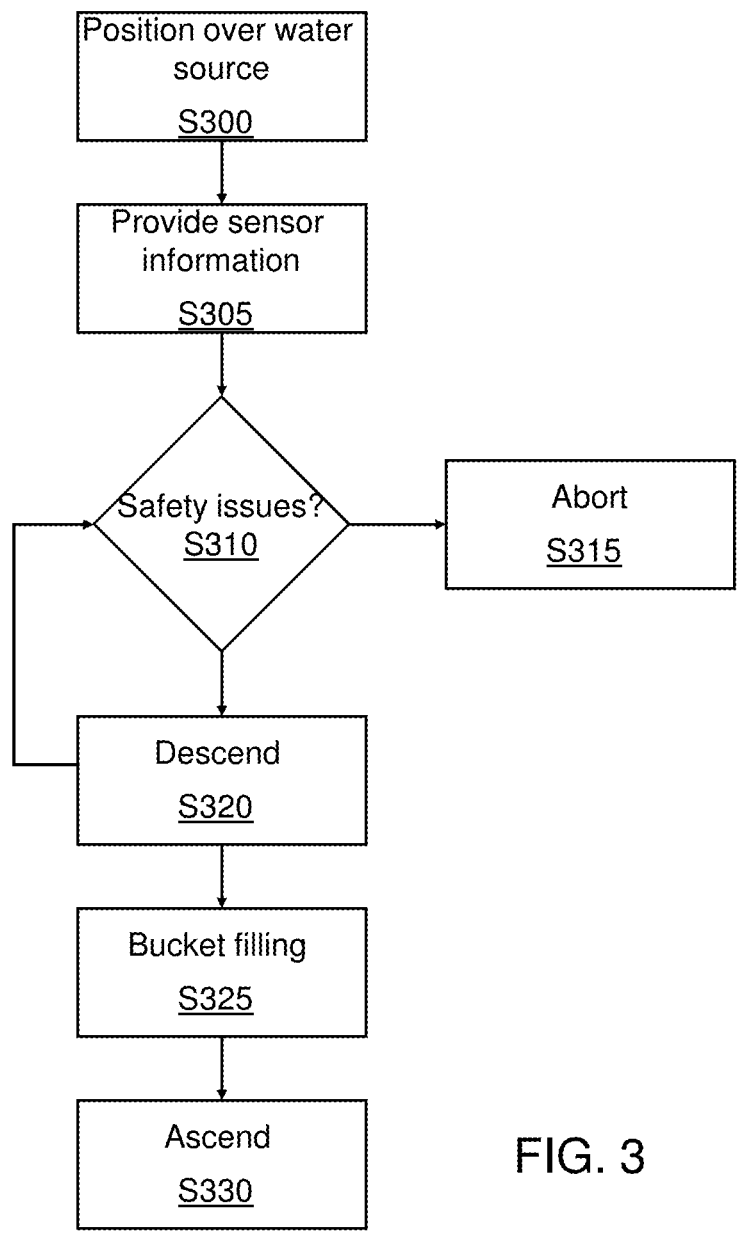
FIG. 3 shows a flow chart implementing processes in accordance with aspects of the invention.
Figure 4:
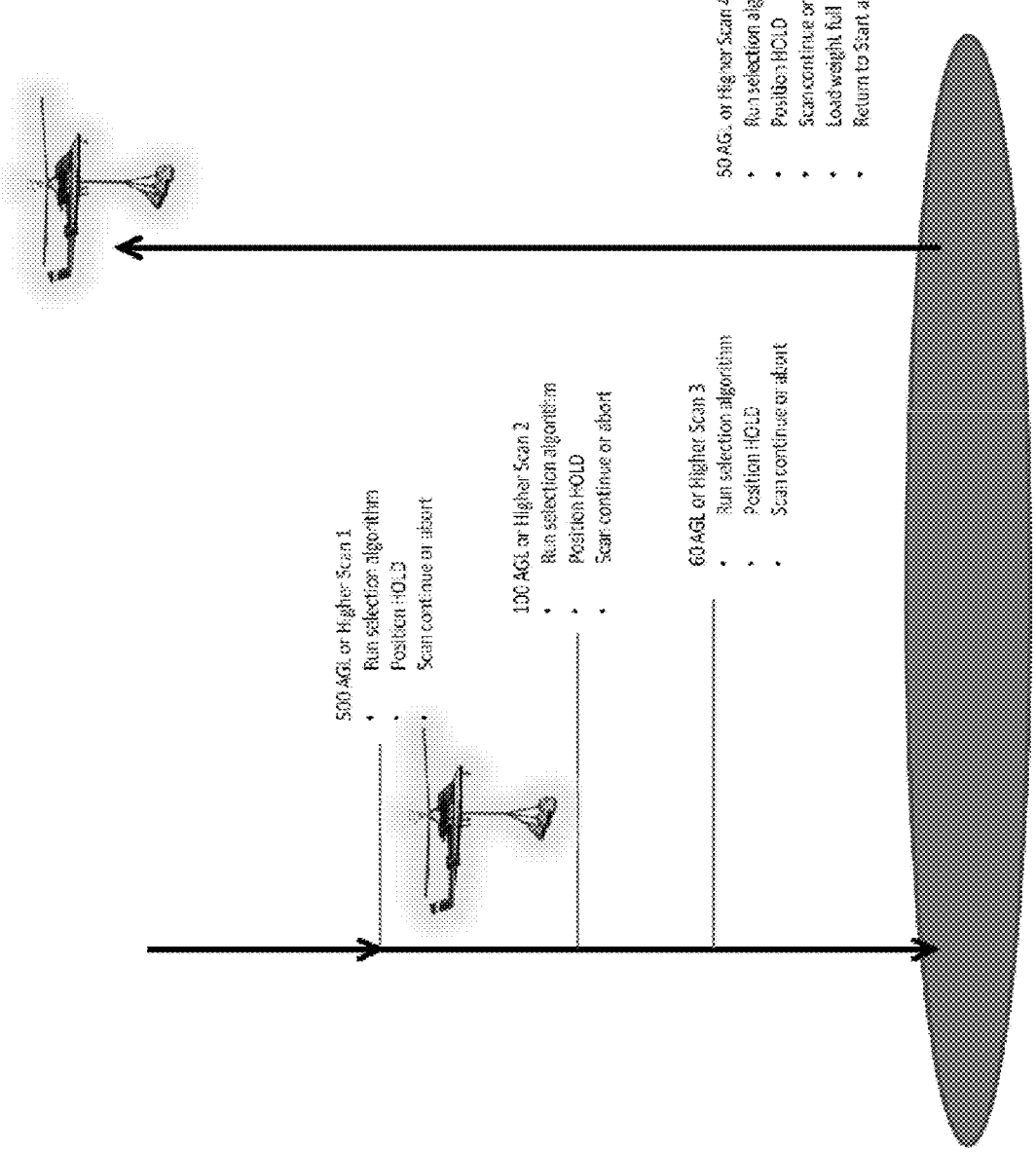
FIG. 4 graphically shows the processes described in FIG. 3.

FIG. 3 depicts an exemplary flow for a process in accordance with aspects of the present invention. The exemplary flow can be illustrative of a system, a method, and/or a computer program product and related functionality implemented on the computing system of FIG. 2, in accordance with aspects of the present invention. The method, and/or computer program product implementing the flow of FIG. 3 can be downloaded to respective computing/processing devices, e.g., computing system of FIG. 2 as implemented with the aerial vehicle 200 of FIG. 1. FIG. 4 graphically shows the processes described in FIG. 3.

At step S300, the aerial vehicle is positioned over a water source. This can be accomplished under control of a ground based operator. At step S305, the sensors can determine key factors such as, e.g., altitude above water, positional location (latitude and longitude), obstacles and obstructions, etc. At step S310, a determination is made as to whether there are any safety issues. If so, the mission is aborted at step S315 and the aerial vehicle can ascend to its original altitude or other altitude. If there are no safety issues, the aerial vehicle continues its descent, in intervals, until the bucket is in the water (as determined by the load sensor). Accordingly, steps S310-S320 can be cycled through, iteratively, until the bucket reaches the water.

At step S325, the bucket is filled with water, by keeping the bucket in the water for a predetermined amount of time, e.g., six seconds. Once the bucket is full, the aerial vehicle can begin its ascent to its original altitude at step S330. In embodiments, the system controller can include a timer to determine the predetermined amount of time. After the aerial vehicle climbs back to the start altitude, the operator can command the next phase of the mission.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, and combinations thereof such as are within the scope of the appended claims.

What is claimed is:

1. A system on an unmanned aerial vehicle, comprising:
   a plurality of sensors provided on the unmanned aerial vehicle to at least sense a distance above a water source;
   a bucket attached to the unmanned aerial vehicle;

a load sensor which senses an initial decrease in weight of the bucket when the bucket is placed in the water source; and a controller to automatically control a descent and ascent of the unmanned aerial vehicle based on the sensed distance of the unmanned aerial vehicle from the water source and upon the determining the bucket is in the water source based on the sensed initial decrease in weight of the bucket, maintaining an altitude of the unmanned aerial vehicle for a predetermined time to fill the bucket with water from the water source and ascending from the water source with the filled bucket.

2. The system of claim 1, wherein the sensors include at least one of RADAR, LIDAR, Acoustic Ranging, Radar Altimeters, and a camera.

3. The system of claim 2, further comprising GPS on the unmanned aerial vehicle, which determines latitude and longitude of the unmanned aerial vehicle.

4. The system of claim 1, wherein the load sensor is provided on a line or hook holding the bucket and which determines the weight of the water within the bucket to ensure that it is not overloaded and/or that the unmanned aerial vehicle will still have adequate power to begin its ascent and flight.

5. The system of claim 2, wherein the controller places the aerial vehicle in a hover mode at a constant altitude when the load sensor senses the initial decrease in weight of the bucket when placed in the water source.

6. The system of claim 5, wherein the controller controls an ascent of the unmanned aerial vehicle after the predetermined time period has elapsed when the bucket is in the water source and filled with the water.

7. The system of claim 1, wherein the controller and/or plurality of sensors communicate with a ground based system.

8. The system of claim 7, wherein the controller provides its functions without connectivity to the ground based system.

9. The system of claim 1, wherein the controller aborts the descent upon the sensors detecting a safety issue.

10. The system of claim 9, wherein the controller, upon aborting the descent, controls the unmanned aerial vehicle to a higher altitude.

11. A computer program product comprising a non-transitory computer readable storage medium having program instructions embodied therewith, the program instructions executable by a computing device to cause the computing device to:

receive external environmental conditions from one or more sensors associated with an unmanned aerial vehicle;

automatically control a descent of the unmanned aerial vehicle to a water source based on the receiving of the external environmental conditions;

sense an initial decrease in weight of a bucket when the bucket is placed in the water source;

fill of the bucket on the unmanned aerial vehicle with water from the water source; and automatically control an ascent of the unmanned aerial vehicle upon filling of the bucket.

12. The computer program product of claim 11, wherein the automatically controlling the descent of the unmanned aerial vehicle to the water source is based on a sensed distance of the unmanned aerial vehicle from the water source.

13. The computer program product of claim 11, wherein the program instructions executable by the computing device cause the computing device to maintain a constant altitude of the unmanned aerial vehicle for a predetermined time during the filling of the bucket.

14. The computer program product of claim 13, wherein the program instructions executable by the computing device cause the computing device to control an ascent of the unmanned aerial vehicle after the predetermined time period has elapsed and to determine the weight of the water within the bucket to ensure that it is not overloaded and/or that the unmanned aerial vehicle will still have adequate power to begin its ascent.

15. The computer program product of claim 11, wherein the program instructions provide its functions without connectivity to a ground based system.

16. The computer program product of claim 11, wherein the program instructions executable by the computing device cause the computing device to abort the descent of the unmanned aerial vehicle and control the unmanned aerial vehicle to a higher altitude.

17. The computer program product of claim 11, wherein the external environmental conditions from one or more sensors is a load placed on the unmanned aerial vehicle and the program instructions executable by the computing device cause the unmanned aerial vehicle to abort its mission when a safety load limit is exceeded.

18. A system comprising:

a CPU, a computer readable memory which has program instructions stored thereon and a computer readable storage medium;

program instructions to sense a distance of an unmanned aerial vehicle from a water source and descend to the water source;

program instructions to sense a reduced weight of a bucket of the unmanned aerial vehicle as the bucket enters the water source and to determine the weight of the water within the bucket to ensure that it is not overloaded and/or that the unmanned aerial vehicle will still have adequate power to begin its ascent and flight; and program instructions to ascend the unmanned aerial vehicle after a predetermined amount of time has passed when the bucket enters the water, wherein the program instructions are stored on the computer readable storage medium for execution by the CPU via the computer readable memory.

19. The system of claim 18, further comprising the program instructions to maintain an altitude of the unmanned aerial vehicle so that the bucket can be filled with water.

20. The system of claim 1, wherein the controller provides the ability of autonomous flight control of the unmanned aerial vehicle including an autonomous control of a flight mission comprising allowing the unmanned aerial vehicle to: maneuver to the water source, fill the bucket, and return to altitude without operator intervention, determine the loads placed on the aerial vehicle; automatically descend and ascend from the water source; automatically maneuver around obstacles and obstructions; and abort a mission of the aerial vehicle and ascend.

* * * * *